United States Patent [19]

Stange et al.

[11] 3,874,989
[45] Apr. 1, 1975

[54] COMPOSITE FILM AND SHEETING

[75] Inventors: Karl Stange, Neustadt; Alfred Hofmann, Bobenheim-Roxheim; Hans-Peter Weiss, Altrip, all of Germany

[73] Assignee: Badische Anilin & Soda Fabrik Aktiengesellschaft, Ludwigshafen, Germany

[22] Filed: Dec. 18, 1972

[21] Appl. No.: 316,228

[30] Foreign Application Priority Data
Dec. 24, 1971 Germany.................... 2164461

[56] References Cited
UNITED STATES PATENTS
2,961,365  11/1960  Sroog................................ 161/231
3,386,476  6/1968  Starkweather...................... 161/231
3,434,916  3/1969  Braunisch et al................... 161/231
3,686,069  8/1972  Winkler et al...................... 161/227
3,728,212  4/1973  Caldwell et al..................... 161/214

FOREIGN PATENTS OR APPLICATIONS
1,949,742  4/1971  Germany

Primary Examiner—George F. Lesmes
Assistant Examiner—William R. Dixon, Jr.
Attorney, Agent, or Firm—Johnston, Keil, Thompson & Shurtleff

[52] U.S. Cl................. 161/190, 161/216, 161/218, 161/227, 161/231, 161/252, 161/249, 161/254
[51] Int. Cl... B32b 27/40, B32b 15/08, B32b 27/08
[58] Field of Search ........... 161/214, 227, 231, 190, 161/253

[57]  ABSTRACT

Composite film or sheeting consisting of (a) at least one ply (A) of polybutylene terephthalate; (b) at least one ply (B) of a thermoplastics material or a metal suitable for the production of foil; and (c) a layer (C) of adhesive between the plies (A) and (B).

5 Claims, No Drawings

COMPOSITE FILM AND SHEETING

The present invention relates to composite film and sheeting comprising a plurality of plies of thermoplastics materials with or without a metal ply, at least one ply consisting of polybutylene terephthalate.

The properties of film and sheeting for packaging purposes are determined to an increasing extent by special applications. The material is required to exhibit, for example, special abrasion resistance, puncture resistance, surface hardness, toughness, stiffness, resistance to light, gloss, transparency and resistance to boiling water and chemicals. It must also exhibit certain values for permeability or impermeability to water vapor, oxygen, carbon dioxide and other gases as well as important processing characteristics, for example it must be capable of being welded, bonded, heat-sealed and deep drawn. The properties can be adapted to meet specific requirements by combining a number of materials in the form of multiply composite film or sheeting.

It is known that different plastics, particularly polyethylene, polypropylene, polystyrene, polyvinyl chloride, polyamide, saturated polyesters, as well as metals may be combined to form composite film or sheeting. In particular, composite film and sheeting of polyethylene terephthalate and polyethylene or metals are known. Film and sheeting containing polyethylene terephthalate as ply material is highly valued, particularly because of its high strength and chemical resistance. However, polyethylene terephthalate film or sheeting cannot be processed with another ply material immediately after its production from solution or by extrusion to form high-grade composite film or sheeting, but must be previously oriented and heat-set or subjected to another heat treatment. Polyethylene terephthalate is also unsuitable for the production of composites by co-extrusion methods. Finally, composites which contain polyethylene terephthalate can only be deep drawn to a very slight extent.

It is therefore an object of the invention to provide composite film or sheeting whose properties are just as good as those of film or sheeting based on polyethylene terephthalate but which can be manufactured by any conventional method of making composite film and sheeting and which moreover is capable of being deep-drawn.

We have now found that, surprisingly, a composite film or sheeting which is composed of:

a. at least one ply (A) consisting of polybutylene terephthalate;
b. at least one ply (B) consisting of a thermoplastics material or a metal conventionally used for foil; and
c. a layer (C) of a conventional adhesive between plies (A) and (B)

is easy to produce and has the abovementioned good properties.

Apart from the unexpectedly high stiffness in flexure, heat distortion strength and puncture resistance, the good deep-drawing properties of the new composite film and sheeting in particular are surprising. It was not foreseeable that the convenient method of co-extruding the individual plies of the film or sheeting direct from the melt would be outstandingly suitable for the production of the novel film and sheeting.

The individual plies of the composite film or sheeting of the invention consist of the following materials:

Ply (A) is made of polybutylene terephthalate prepared by a conventional method, for example by polycondensation of 1,4-butanediol and an ester of terephthalic acid in a molar ratio of 1:1 in the presence of a polycondensation catalyst. A product having a viscosity number of 90 to 170, preferably of 130 to 145 (determined according to DIN 53,727 in solution in a mixture of o-dichlorobenzene and phenol in a ratio of 2:3 by weight) is generally used. German Published Application No. 2,049,538 may be referred to for further starting materials and methods of producing a polybutylene terephthalate material which is suitable for use in the composite film and sheeting of the invention.

Ply (B) which is to be bonded to the polybutylene terephthalate ply (A) consists of a thermoplastics material or a metal usually used for the production of foil. Suitable thermoplastics include the plastics conventionally used in the production of composite film or sheeting such as polyethylene of a density of from 0.92 to 0.96 g/ccm, polypropylene, ethylene/vinyl acetate copolymers, polystyrene, polyamides, polymers based on cellulose and cellulose acetate, and polyvinyl chloride. Synthetic polyamides such as polycaprolactam, polycapryllactam, polylaurolactam, polyenantholactam, nylon-6,6, nylon-6,10, nylon-6,12, poly-11-aminoundecanoic acid and copolymers thereof are particularly preferred. The said polymers may also be used in admixture with one another. Ply (B) may also be made of a metal conventionally used for the production of foil, for example aluminum, copper, lead, steel, especially corrosion-resistant steel. In this case not all methods of processing thermoplastics can be used for the production of the composite film or sheeting.

Layer (C) provided between plies (A) and (B) consists of adhesive. Hot melt adhesives conventionally used for film lamination with or without primers can be used for this purpose and may be chosen to suit the method of manufacture and the properties required of the composite. Polymers and copolymers based on urethane and ethylene polymers containing polar groups are preferred. The following can be processed with exceptional ease and also provide an outstanding bond:

Carboxyl-containing ternary and quaternary ethylene copolymers which contain from 60 to 90% by weight of ethylene units, from 0.5 to 20% by weight of units of an ethylenically unsaturated carboxylic acid, from 0.5 to 20% by weight of units of an ester of an ethylenically unsaturated carboxylic acid and from 0.3 to 5% by weight of isobutylene units. The production of such copolymers is described in U.K. Pat. No. 1,240,508 and their use for the production of composite film and sheeting is disclosed for example in German Published Applications Nos. 1,669,685 and 1,949,742.

The following thicknesses of the individual plies forming the composite film or sheeting are generally suitable depending on the purpose for which the film or sheeting is to be used and the intended processing technique:

for ply (A) from 0.01 to 1.2 mm; for ply (B) from 0.01 to 1.2 mm; for layer (C) from 0.005 to 0.7 mm. These values are not limitative, but merely serve as a guide for the production of composite film and sheeting for packaging purposes. They may be varied either upwardly or downwardly within reasonable limits without the composite being impaired. Layer (C) which consists of adhesive usually does not have to be as thick as plies (A) and (B). Furthermore, the composite may contain plies (A) and (B) and layer (C) more than once so that a five-ply or seven-ply structure is obtained. The thickness of the individual plies may vary or individual plies may only be partially formed as is desired for example in the case of printed circuits or for decorative purposes.

The production of the composite material according to the invention from the individual plies may be carried out by various conventional methods, for example by pressing the individual plies placed on top of one another in the desired sequence in a platen press at superatmospheric pressure and elevated temperature, generally at a temperature of from 100° to 350°C, preferably from 220° to 300°C, or by co-extrusion through sheeting dies, blown-bubble extrusion, extrusion coating or laminating under the conditions known for the production of composite film or sheeting. In the production of a composite from existing film or sheeting, the individual plies may be subjected, prior to bonding, to a conventional treatment for improving adhesion, for example to corona discharge.

Composite film or sheeting according to the invention is suitable for a wide variety of applications, particularly as packaging film exhibiting high impermeability to gas, abrasion resistance, puncture resistance, stiffness and good deep-drawing properties, as well as for the production of bags, cups and bowls and for applications where high elasticity and strength are required simultaneously.

The following Examples in which parts are by weight further illustrate the invention.

EXAMPLE 1

The following are placed in a platen press:
a 0.35 mm sheet of polyethylene having a density of 0.924 at the bottom;
a 0.1 mm layer of a quaternary copolymer containing 87% by weight of ethylene units, 4.5% by weight of acrylic acid units, 7% by weight of tertiary-butyl acrylate units and 1.5% by weight of isobutylene units in the middle; and
a 0.2 mm sheet of polybutylene terephthalate (prepared from equimolar amounts of 1,4-butanediol and dimethyl terephthalate; mean molecular weight about 20,000) on the top. The press is closed and the assembly is compressed for six minutes at 225°C under a pressure of 0.2 kg per cm² to form a single structure which is then cooled to 60°C, removed from the press and allowed to cool to room temperature without the application of pressure. A composite film is obtained which has a thickness of about 0.6 mm and exhibits a peel torque (measured according to ASTM D 1781-62) of 18.5 kg cm/cm, good flexural strength and high heat distortion strength. The film can be heat-sealed on both sides, is impermeable to odor, water vapor and oxygen and can be readily deep-drawn on conventional packaging machines. In the impact penetration test according to DIN 53,373 the values obtained were 1050 kg cm/cm on the polybutylene terephthalate side and 980 kg cm/cm on the polyethylene side. The film is particularly suitable for packaging foodstuffs.

EXAMPLE 2

A unit for the production of three-ply blown film (manufactured by Fa. Troester, Hanover, Germany) is used which has an extrusion die with three concentrically arranged annular gaps having a width of 0.7 mm each, each gap being supplied with the substance to be processed by its own extruder. Polyamide of a mean molecular weight of 25,000 to 30,000 is extruded from the innermost gap at a temperature of the material of 265°C at a rate of 35 kg/hour. A quaternary ethylene copolymer (as used in Example 1) is extruded at a rate of 10 kg/hour at a temperature of the material of 200°C from the central gap and polybutylene terephthalate having a viscosity number $\eta$ of 135 is extruded from the outer gap at a rate of 27 kg/hour at a temperature of the material of 260°C.

The plastic tube of film thus formed is inflated by compressed air until it assumes a diameter of 300 mm. The three individual plies combine to form a single structure which is cooled, taken off by a pair of rolls at room temperature and wound up in the form of a flattened tube or after it has been slit open at either side. The film has a thickness of 0.08 mm, a permeability to oxygen and carbon dioxide of 0.3 and 2 (ccm × 100 mm/m² × d × atm) × $10^{-2}$ respectively and a water-vapor permeability of 1.9 g × 100 μ/m² at 0°C and 85% humidity. The results obtained in the impact penetration test according to DIN 53,373 are as follows:
polyamide side: 1025 kg cm/cm;
polybutylene terephthalate side: 1160 kg cm/cm.

By contrast, in the case of a composite made in the same way but employing high pressure polyethylene instead of polybutylene terephthalate the values are 810 (polyamide side) and 820 (polyethylene side).

EXAMPLE 3

The following are placed on top of one another in a platen press:
a 0.5 mm aluminum foil;
a 0.1 mm layer of the quaternary ethylene copolymer described in Example 1;
a 2 mm sheet of polybutylene terephthalate;
a 0.1 mm layer of the above ethylene copolymer; and
a 0.5 mm aluminum foil. This assembly is then compressed for 6 minutes at a temperature of 230°C under a pressure of 0.2 kg/cm² to form a single structure. The composite is removed from the press and allowed to cool. A board exhibiting outstanding flexural strength is obtained. The peel torque (determined according to ASTM D 1781-62) is 6.0 kg cm/cm. Boards of this type are particularly suitable for decorative purposes.

EXAMPLE 4

A sheet die is used to prepare a polybutylene terephthalate film having a width of 330 mm and a thickness of 0.025 mm. This film is coated with a two-component adhesive based on urethane (Liofol UK 3640/UK 6000, a product of Henkel & Cie. GmbH, Duesseldorf, Germany) at a rate of 2.5 g/m² using an applicator roll.

A film of high pressure polyethylene having a thickness of 0.05 mm and a width of 330 mm prepared by tubular extrusion and pretreated by corona discharge is applied to the coated polybutylene terephthalate film with the aid of rollers at 50°C and bonded thereto. The composite film obtained can be deep-drawn on conventional packaging machines. It is strong and elastic and exhibits good transparency (the haze value according to ASTM D 1003 is 6%).

We claim:
1. A composite film or sheeting comprising (a) at least one ply (A) consisting of polybutylene terephthal- ate: (b) at least one ply (B) bonded to said ply (A) of a member selected from the group consisting of polyethylene of a density of from 0.92 to 0.96 g/ccm, polypropylene, ethylene/vinyl acetate copolymers, polystyrene, polyamides, polymers based on cellulose and cellulose acetate, polyvinyl chloride, aluminum, copper, lead and steel, and (c) at least one ply (C) of a hot melt adhesive bonding ply (B) to ply (A) selected from the group consisting of ethylene and urethane based polymers containing polar groups.

2. A composite film or sheeting as set forth in claim 1 in which ply (B) consists of a polyamide selected from the group consisting of polycaprolactam, polycapryllactam, polylaurolactam, polyenantholactam, nylon-6,10, nylon-6,12, poly-11-aminoundecanoic acid and copolymers thereof.

3. A composite film or sheeting as set forth in claim 1 in which ply (B) consists of a polyolefin.

4. A composite film or sheeting as set forth in claim 1 in which layer (C) consists of a carboxyl-containing ethylene copolymer containing from 60 to 90% by weight of ethylene units, from 0.5 to 20% by weight of units of an ethylenically unsaturated carboxylic acid, from 0.5 to 20% by weight of units of an ester of an ethylenically unsaturated carboxylic acid and from 0.3 to 5% by weight of isobutylene units.

5. A composite film or sheeting as set forth in claim 1 wherein at least one of said ply (B) is aluminum foil.

* * * * *